United States Patent
Perea et al.

(10) Patent No.: US 9,644,296 B2
(45) Date of Patent: May 9, 2017

(54) SYSTEM AND METHOD FOR MANUFACTURING NET SHAPE PREFORM FROM TEXTILE STRIPS

(71) Applicant: GOODRICH CORPORATION, Charlotte, NC (US)

(72) Inventors: Paul Perea, Pueblo West, CO (US); Jean-Francois Le Costaouec, Pueblo West, CO (US); John Linck, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 376 days.

(21) Appl. No.: 14/531,613

(22) Filed: Nov. 3, 2014

(65) Prior Publication Data

US 2016/0122921 A1     May 5, 2016

(51) Int. Cl.

| | | |
|---|---|---|
| *D04H 18/02* | (2012.01) | |
| *D04H 3/105* | (2012.01) | |
| *D04H 3/04* | (2012.01) | |
| *D04H 1/46* | (2012.01) | |
| *D04H 1/70* | (2012.01) | |

(Continued)

(52) U.S. Cl.
CPC ............. *D04H 18/02* (2013.01); *B29B 11/16* (2013.01); *D03D 37/00* (2013.01); *D04H 1/46* (2013.01); *D04H 1/70* (2013.01); *D04H 3/002* (2013.01); *D04H 3/04* (2013.01); *D04H 3/105* (2013.01); *D04H 18/00* (2013.01)

(58) Field of Classification Search
CPC .......... D04H 18/02; D04H 1/70; D04H 18/00; D04H 3/04; D04H 1/46; D04H 3/02; D04H 3/05; D04H 3/102; D04H 3/105; D04H 5/02; D04H 5/08; D01G 23/00; D01G 23/06; D01G 25/00; B32B 7/005; B32B 7/08; B32B 5/12; B32B 5/26; B32B 38/1808; B29B 11/14; B29B 11/16; D03D 37/00
USPC ........... 28/101, 102, 107, 109, 110, 113, 114
See application file for complete search history.

(56) References Cited

U.S. PATENT DOCUMENTS 3,342,219 A * 9/1967 Malchair ................ D03D 37/00
                                                                       139/457
4,365,651 A * 12/1982 Torii ...................... D03D 37/00
                                                                       139/458

(Continued)

FOREIGN PATENT DOCUMENTS

| EP | 0683261 | 11/1995 |
|---|---|---|
| EP | 2937197 | 10/2015 |
| FR | 2892428 | 4/2007 |

OTHER PUBLICATIONS

Extended European Search Report dated Mar. 8, 2016 in European Application No. 15192783.7.

*Primary Examiner* — Amy Vanatta
(74) *Attorney, Agent, or Firm* — Snell & Wilmer L.L.P.

(57) ABSTRACT

A preform manufacturing apparatus comprising a supply of fiber strip, a moveable positive fiber strip delivery mechanism coupled between a desired lay down location and the supply of fiber strip to positively deliver and orient the supply of fiber strip to the desired lay down location, and an optional electronic unwinder coupled to the supply of fiber strip when more delicate textile strips are used to fabricate the net shape preform is described herein. The electronic unwinder is configured to interact with the moveable positive fiber strip delivery mechanism.

11 Claims, 4 Drawing Sheets

(51) Int. Cl.
*B29B 11/16* (2006.01)
*D04H 3/002* (2012.01)
*D04H 18/00* (2012.01)
*D03D 37/00* (2006.01)

(56) References Cited

U.S. PATENT DOCUMENTS

| | | | | |
|---|---|---|---|---|
| 4,977,933 A * | 12/1990 | Brais | .................... | D03D 37/00 139/15 |
| 5,242,745 A * | 9/1993 | Aucagne | ................. | D03D 3/08 139/11 |
| 5,662,855 A * | 9/1997 | Liew | ...................... | D04H 1/498 156/184 |
| 6,009,605 A * | 1/2000 | Olry | ....................... | B29B 11/16 28/107 |
| 6,347,440 B1 * | 2/2002 | Duval | .................... | D04H 18/02 28/107 |
| 6,367,130 B1 * | 4/2002 | Duval | .................... | D04H 18/02 28/107 |
| 7,120,975 B2 * | 10/2006 | Delecroix | .............. | D04H 1/498 28/101 |
| 7,185,404 B2 * | 3/2007 | Delecroix | .............. | D04H 18/02 28/101 |
| 8,375,536 B2 * | 2/2013 | Delecroix | .............. | D04H 18/02 28/107 |
| 2003/0052212 A1 * | 3/2003 | Anderson | .............. | B29C 53/665 242/436 |
| 2005/0172465 A1 * | 8/2005 | Duval | .................... | B29B 11/16 28/101 |
| 2007/0090564 A1 * | 4/2007 | Delecroix | ............ | D04H 1/4242 264/258 |
| 2010/0218902 A1 * | 9/2010 | Yoshikawa | ............. | B29C 70/20 156/441 |
| 2011/0275266 A1 * | 11/2011 | Lecostaouec | .......... | D04H 18/02 28/107 |
| 2015/0273811 A1 * | 10/2015 | Le Costaouec | ......... | B29B 11/16 156/64 |
| 2016/0122930 A1 * | 5/2016 | Le Costaouec | ........ | D05B 23/00 112/470.17 |
| 2016/0265611 A1 * | 9/2016 | Simpson | .................. | D04H 1/46 |

* cited by examiner

SYSTEM AND METHOD FOR MANUFACTURING NET SHAPE PREFORM FROM TEXTILE STRIPS

FIELD

This disclosure generally relates to textile preparation, and more particularly, to systems and methods associated with creating preforms using multi-axial narrow strips, such as multi-axial narrow strips oriented in the circumferential direction.

BACKGROUND

Carbon/carbon ("C/C") parts are employed in various industries. An exemplary use for C/C parts includes using C/C parts as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat, and thus, is able to dissipate heat away from the braking surfaces that is generated in response to braking C/C material is also highly resistant to heat damage, and is capable of sustaining friction between brake surfaces during severe braking, without a significant reduction in the friction coefficient or mechanical failure. The fabrication of C/C parts involves attention to detail at each step of the process.

SUMMARY

According to various embodiments, a needled preform manufacturing apparatus comprising a supply of fiber strip wherein the supply of fiber strip comprises a fiber strip, and a moveable positive fiber strip delivery mechanism coupled between a desired lay down location and the supply of fiber strip to positively deliver and orient the fiber strip to a circular needle loom is described herein. Depending on durability of fiber strip, the strip may be directly pulled by the coordinated movement of the bed plate and the needles.

According to various embodiments, a method comprising forming a fiber strip from at least one of a wide stitch-bonded stretch broken carbon fiber fabric or a pre-needled multi-axial continuous oxidized polyacrylonitrile (PAN) fiber, positively transporting and placing a length of the fiber strip to a desired orientation via a moveable fiber strip delivery mechanism interposed between a fiber strip supply and a desired lay down location of the fiber strip, and controlling delivery of a fiber strip tension from the fiber strip supply through an electronic unwinder is described herein.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, fiber bundles, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
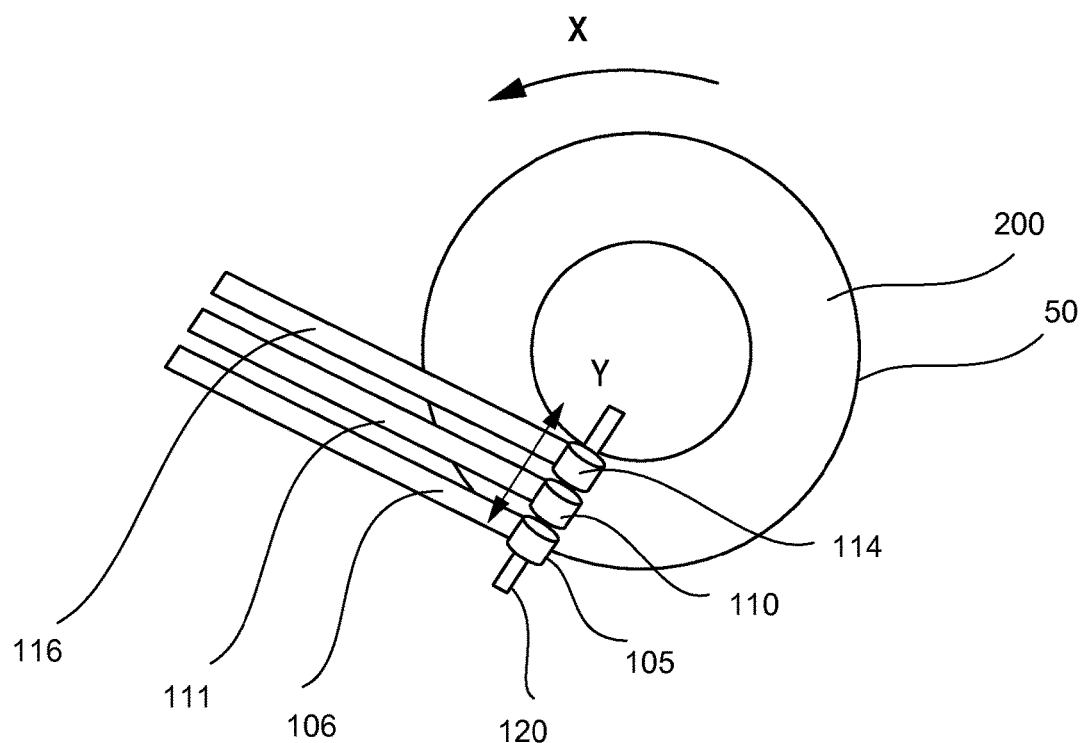
FIG. 1 illustrates a fiber strip laydown system comprising a moveable fiber delivery assembly in accordance with various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

Conventionally, C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Two or more layers of fibers may be layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

Currently, most carbon-carbon aircraft brakes are manufactured from preforms that have been cut or die punched from a long board of needled Oxidized Pan Fiber (OPF) material. This technology yields about 50% waste and is inefficient as compared with the methods described herein. The various fiber orientations within each horizontal layer of the preform are typically laid down continuously across the majority of each surface of the preform. The layers may be built separately outside the circular needle loom (CNL) in the form of helical continuous fabric as described in U.S.

Pat. No. 6,009,605 or may be built in-situ on the needle loom as described in U.S. Pat. No. 7,185,404.

As referred to herein, "stretch broken fibers" comprise short length fibers ranging from about 1-2 inches to about 5-6 inches and are very amenable to a needle punching step. As used herein, the term "tow" is used to refer to one or more strands of substantially continuous filaments. Thus, a "tow" may refer to a plurality of strands of substantially continuous filaments or a single strand of substantially continuous filament. "Fiber bundle" may refer to a tow of substantially continuous filaments. "Fiber bundle" may also refer to various formats of narrow strips of stretch broken fibers. A "textile" may be referred to as a "fabric" or a "tape." A "loom" may refer to any weaving device, such as a narrow fabric needle loom.

According to various embodiments and with reference to FIG. 1, a net shape needled preform is fabricated by introducing at the circular loom bed plate turntable 200 and/or circular need loom 50 (CNL) one or more multi-axial narrow strips of fabric ("fiber strips"). The multi-axial narrow strips may be laid down on the CNL 50 generally in the circumferential direction as shown.

According to various embodiments the narrow strips of fabric may be formed by stacking a first level of a unidirectional assembly of tows on top of a second level of unidirectional assembly of tows oriented in a direction different that the orientation direction of the first assembly of tows. This direction may be perpendicular or ±60 degrees. These levels may be lightly needled together. These sheets of multilayered assemblies of tows may be cut into strips of desired widths.

The multi-axial narrow fiber strips may be formed into substantially continuous lengths. For instance, the continuous narrow strips may take the form of unidirectional, bi-directional and/or multi-axial carbonized carbon fiber textiles. These textiles may be prepared as a multi-axial narrow strip through various processes, such as the process described above. For instance, the multi-axial strip may be a composite of a first unidirectional fiber and a second strip with a bias orientation direction. These processes may also include weaving, needling, stitch bonding, warp knitting adhesive bonding, or hot-melt bonding techniques. Alternatively, the multi-axial narrow fiber strips may be cut from wider fabrics prepared with similar textile technologies.

The targeted preforms present circumferential and off axis fiber orientations (such as zero plus or minus 45°, zero plus or minus 30°; and zero plus or minus 60°). Various levels of the fiber strip 106 lay down may be oriented in a different fiber rotation (see FIG. 2). For instance, a first layer of fiber strips may comprise a zero plus or minus 60° fiber orientation while a second layer disposed directly on top of the first layer of fiber strips may comprise a zero plus or minus 25° fiber orientation. The fiber strips may be multi-axial narrow strips. The fiber strips may comprise various desired fiber orientations. In this way, conformable thin textiles may be achieved by preparing the textile strips from low areal weight spreaded tows and imparting darts, such as a series of stitches, along at least one edge of the fiber strips 106, 111, 116.

Figure 2:
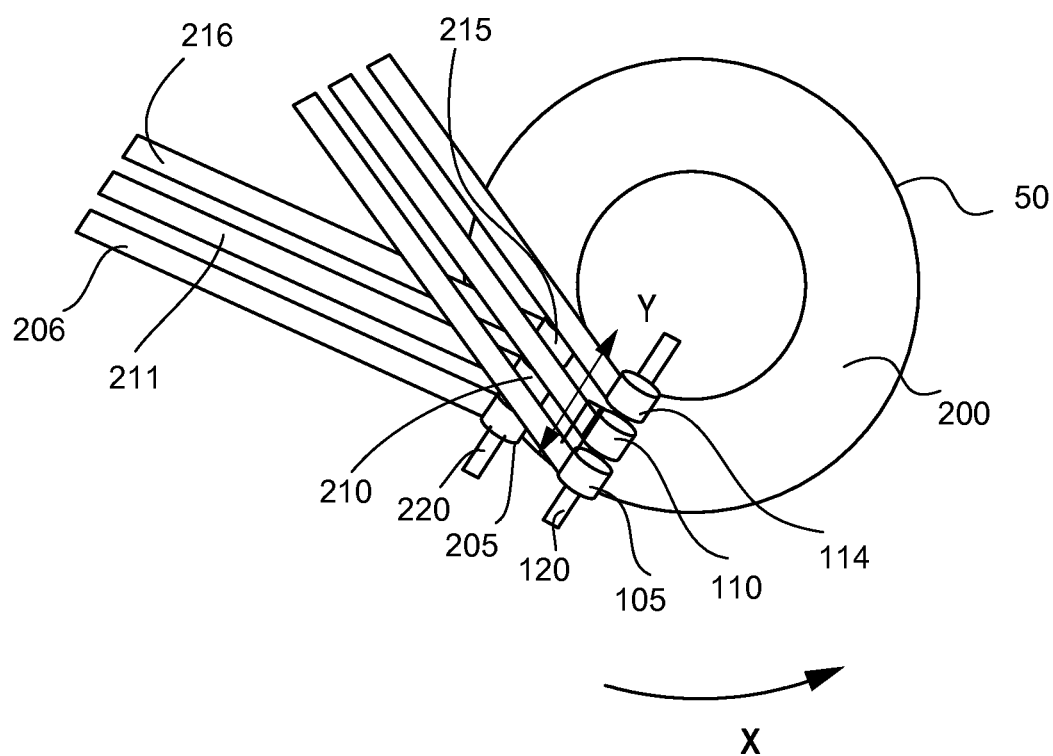
FIG. 2 illustrates a fiber strip laydown system comprising a plurality of moveable fiber delivery assemblies in accordance with various embodiments.
Figure 3:
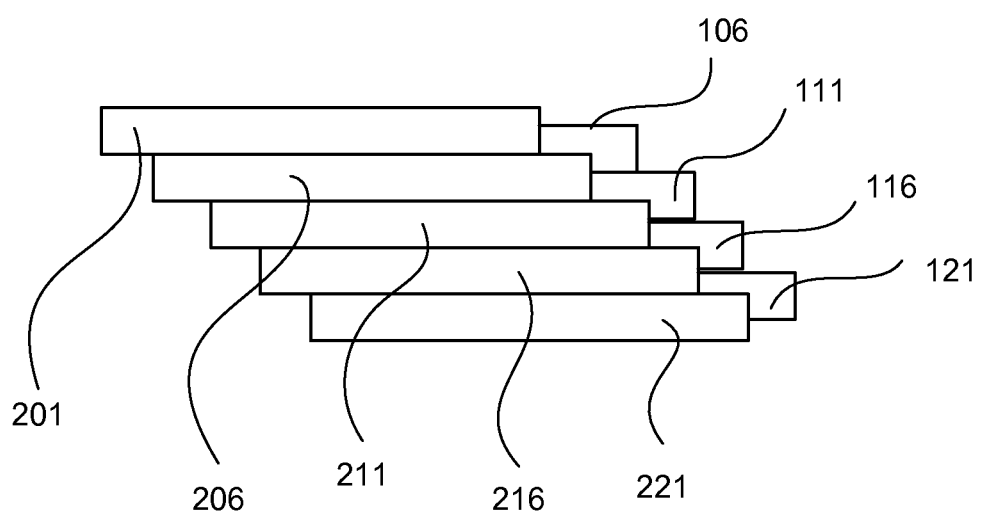
FIG. 3 illustrates staggered layers of fabric strips in accordance with various embodiments.

According to various embodiments and with reference to FIG. 3, each layer of laid fiber strips 106, 111, 116 may be laid at substantially equivalent axis fiber orientations (such as zero plus or minus 45°, zero plus or minus 30°; and zero plus or minus 60°). However, the placement of the fiber strip 106, 111, 116 may be offset in the Y direction, radially, such that the edges of two adjacent strips in a first layer are positioned towards the center of a fiber strip 201, 206, 211, 216 in a second layer. For instance and with continued reference to FIG. 3, a first layer comprising fiber strip 106, 111, 116, and 121 may be offset by a fraction of a width of a fiber strip, such as one half width of a fiber strip from a second layer of fiber strips comprising fiber strip 201, 206, 211, 216 and 221. In this way, mechanical strength is improved by introducing staggered layers (as depicted in FIG. 3). For instance, the moveable fiber delivery assembly 120 may be configured and/or programmed and directed by a controller to shift in the Y direction (either towards the inner diameter or the outer diameter of the lay down location), such as half the width of the fiber strip 106 with each layer laid on the preform. A second moveable fiber delivery assembly, such as moveable fiber delivery assembly 220 as depicted in FIG. 2, may be set such that it delivers lengths of fabric strips to a second layer offset in the Y direction, radially, one half the width of fiber strip 106 positioned by the moveable fiber delivery assembly 120 in a first layer. Second moveable fiber delivery assembly may comprise a plurality of rollers 205, 210, 215.

According to various embodiments, stretch-broken fibers may be introduced within the fiber strip for their increased conformability during lay-up and their ability to readily to readily transfer in-plane fibers into the Z direction during needling. This may be accomplished by cutting continuous strips from a fabric of wide stitch-bonded stretch broken carbon fibers. The stitch-bonded fabric may be prepared with unidirectional and/or bi-directional fiber orientation. According to various embodiments, a simultaneously feed of a bi-dimensional fiber strip and a circumferential unidirectional fiber strip may be laid down in levels. The bi-dimensional stitch-bonded fabric may have a construction close to plus or minus 45° for increased deformation. The unidirectional fabric may comprise a unidirectional stretch broken carbon fiber fabric or a continuous carbon fiber tow. The continuous carbon fiber tow may be a spreaded continuous carbon fiber tow. The unidirectional fabric supply and/or the bi-dimensional stitch-bonded stretch broken fabric supply may be directly fed in the circumferential direction of the circular needle-punching loom. For instance, a positive delivery transport method may be utilized to deliver the fabric strips to the circular needle loom 50.

According to various embodiments, continuous fabric strips of about 0.400 to about 1.800 inch wide (about 1.016 centimeters to about 4.572 centimeters) may be cut from rolls of fabric, such as rolls of stretch broken fabric and wound on special spools. The stretch broken fabric may be effectively prepared from large carbon fiber tows, such as 50 K tows. The fiber construction of the fiber strip comprising short length fibers may comprise two layers of fibers oriented in a direction of plus or minus 45 degree to plus or minus 15 degree. A narrow width of the fiber strips may provide enhanced stretching capability which greatly facilitates re-shaping of straight ribbon into a helical geometry during application in the circular needle loom.

A design consideration may be the control of the degree of looseness of the stitches. The looseness of the stitches further impacts the ability of the fiber strip to deform. The stitch bonded fiber strip and the circumferential tow or other textile forms described herein may be simultaneously fed on the bed plate of the circular needle loom 50. The multi-axial strips may be laid down in such a way that each consecutive layer of stitch bonded fiber strips presents a staggered pattern across the radial direction of preform as shown in FIG. 2.

Potential feed textiles to fabricate annular needled preforms such as continuous helical fabrics are typically fabricated using take-off systems to pull the fabric and tows through the weaving loom. This conventional approach imparts tension on the ribbons and forces the bundle of tows from their original as-supplied ribbon shapes into rounded, packed tows having a generally circular and/or oblong cross-section. These fabrics with localized high fiber volume fiber bundles require high level of needling to fabricate a carbon preform with a low fiber volume, such as for the manufacturing of carbon-carbon friction disks.

Figure 4:
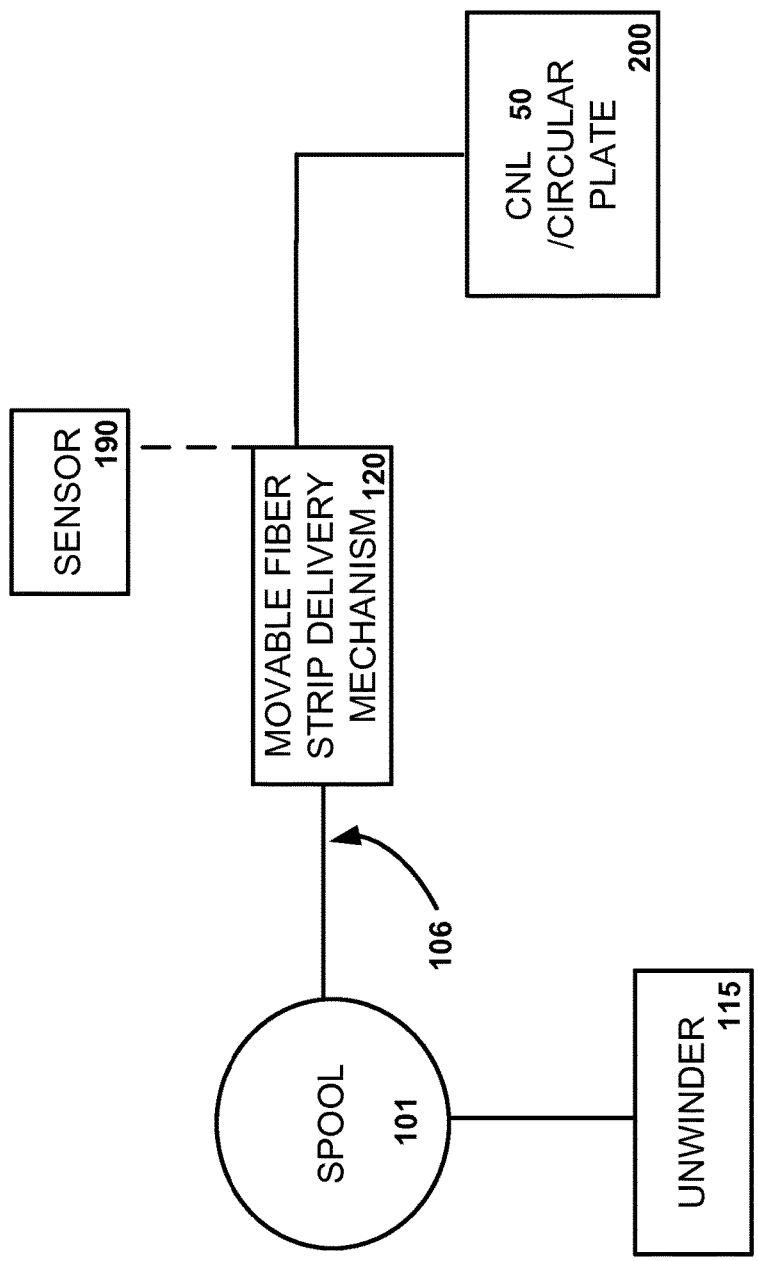
FIG. 4 illustrates a block diagram of various elements of a preform manufacturing system in accordance with various embodiments.

According to various embodiments and with reference to FIG. 4, a device may be utilized to deliver a substantially continuous feed of a fiber strip 106 to a needling apparatus, such as a circular needle loom 50, also known as a circular needle punching loom, and/or a lay down surface, such as a circular loom bed plate turntable 200. The device may be a device configured to impart little to no tension on the fiber strip 106 as the fiber strip 106 is delivered from a fiber strip 106 supply, such as a spool 101, to the circular needle loom 50 or circular loom bed plate turntable 200. According to various embodiments, the device comprises an unwinder 115, configured to maintain constant adjustable minimum tension on the fiber strip 106 as the fiber strip 106 is positively driven with fiber strip 106 moveable fiber delivery assembly placed between a delivery location and the spool 101. A sensor 190 measuring linear speed of the fiber strip 106 within the delivery mechanism communicates with the unwinder 115. The tension between the unwinder 115 and the fiber strip 106 moveable fiber delivery assembly is low. Stated another way, the tension between the fiber strip 106 moveable fiber delivery assembly 120 and the fiber strip 106 placement surface is extremely low as moveable fiber delivery assembly 120 pushes the fiber strip 106 forward (i.e. towards the delivery location). Fiber delivery assembly 120 may or may not push the fiber strip forward. For instance, the pre-needled OPF may be more sturdy (e.g., more rigid) as compared with a stretch broken fiber strip, as discussed herein, which are less rigid. As the fiber strips are fed into the circular needle loom, they are needled and therefore attached to the bed plate or previous layers and as such are being pulled by the rotational speed of the bedplate turntable. For instance, the speed of the supply of the fiber strips may be dependent upon the supply of fiber strip's location relative to the outer diameter ("OD") or interior diameter ("ID") of a preform being made and may be pulled by and/or driven by the speed of the revolutions of the bedplate turntable. An electronic unwinder may be used to interact with the moveable positive fiber strip delivery mechanism.

The fiber strip 106 moveable fiber delivery assembly 120 may comprise pinch rollers with a motor driving at least one of the rollers. Several transport roller configurations are possible. Each fiber strip 106 delivery mechanism may transport one or several fiber strip 106. The spatial location of the fiber strip 106 delivery system above the circular loom bed plate turntable 200 may be automatically adjusted to achieve targeted fiber orientation within the preform.

With renewed reference to FIG. 1, a strip of fabric may be laid down on the bed plate of the circular needle loom 50. Moveable fiber delivery assembly 120 comprising a plurality of rollers 105, 110, and 114, may be positioned at a selected angle with the general rotational direction X of the turntable. The tow delivery assembly is automatically moved in the Y direction and fiber strips 106, 111, and 116 may be deposited on the circular needle loom 50. Rotational movement of circular loom bed plate turntable 200 may be in either the clockwise and/or counter-clockwise direction as desired.

In various embodiments, with reference to FIG. 2 multiple layers of fiber strip 106 may be simultaneously laid down on circular loom bed plate turntable 200. A plurality of moveable fiber delivery assemblies 120, 220 supporting conical pinch rollers 105, 110, 114 may be used to lay down fiber strip 106, 111, 116, 206, 211, 216. Each set of positive moveable fiber delivery assemblies 120, 220 may deliver one or several fiber strip 106. The speed of the fiber strip 106 delivery may be coordinated with rotational speed of turntable and/or the unwinder 115.

Control of the fiber strip 106 transport is accomplished by using positive moveable fiber delivery assembly mechanism 120. The positive moveable fiber delivery assembly may be "feed device" configured to direct the path of the fiber strip 106. The positive moveable fiber delivery assembly 120 may communicate with an electronic unwinder 115 that allows the un-winding and transport of fiber strip 106 under minimum controlled tension.

This method may be used to lay down a desired fiber strip 106 at any desired orientation directly on the circular needle punching loom, such as on a circular loom bed plate turntable 200. According to various embodiments, with reference to FIG. 2 arrangement of a plurality of transport/feeding sub-systems on a common mechanized axis Y enables, in particular, the rapid application of multiple fiber strip 106 at once. Using an unwinder 115 with controlled low tension allows using miniature servomotors to positively drive the fiber strip 106 and fit the feeding subsystem into a small envelop, which is an important feature when fiber strip 106 are being fed directly to the circular needle loom 50. In this way, unwinder 115 with servomotors may positively drive the fiber strip 106 with extra slack such that little to no tension is applied to the fiber strip 106.

According to various embodiments, a process to manufacture, at high speed, a net shape preform, such as an annulus, with circumferential fibers strips oriented at selected angles from the annular preform radial directions is disclosed. A fiber strip 106 feeder's assembly is used to continuously and simultaneously lay down multiple fiber strips 106 layers on a circular needle loom 50 and/or circular loom bed plate turntable 200.

According to various embodiments, subsystems to achieve the desired lay down pattern may include a plurality of cylindrical nip or conical pinch rollers applying pressure on the fiber strip 106 to drive it to the delivery location. Each tow moveable fiber delivery assembly 120 (which may be cylindrical or conical) may be driven by its own servomotor. In various embodiments, only one of each set of rollers is motorized and the drive of the fiber strip 106 is accomplished by using a second spring loaded conical roller or a system where the roller is mechanically pushed into position.

The face of the delivery location, such as the circular loom bed plate turntable 200, may be divided into sections to which multiple lengths of fiber strip 106 are delivered simultaneously. This may decrease the time it takes to form a layer of preform. Each section may have a dedicated driven roller. The speed of the fiber strip 106 delivery, based on the location of the driven roller with respect to the preform ID and OD, may vary. A sensor 190 (with brief reference to FIG. 4) coupled to the roller and/or the circular loom bed plate turntable 200 may direct the speed of the unwinder 115. For instance, the circumferential speed of the electronic unwinder 115 may be varied based on readings of the sensor 190 coupled to at least one of the fiber strip 106 delivery mechanism and the desired lay down location of the fiber strip 106. A controller may also direct and/or vary the speed of the unwinder 115 based on the lay down pattern and/or orientation of the fiber strip 106. The controller may comprise a processor and may be coupled to a non-transitory, tangible storage medium.

As noted above, existing reels, spools and other mechanisms may be used for storing and deploying spiral wound textiles and/or fiber strip 106. Although this disclosure illustrates and describes various embodiments, equivalents and modifications will occur to others who are skilled in the art upon reading and understanding of the disclosure.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A needled preform manufacturing apparatus comprising:
    a supply of fiber strip, wherein the supply of fiber strip comprises a fiber strip;
    a circular needle loom comprising an inner diameter and an outer diameter; and
    a moveable positive fiber strip delivery mechanism coupled between a desired lay down location and the supply of fiber strip to positively deliver and orient the fiber strip to the circular needle loom, wherein the moveable positive fiber strip delivery mechanism comprises a plurality of rollers on a common axis, wherein the moveable positive fiber strip delivery mechanism is configured to move in a radial direction towards at least one of the inner diameter of the circular needle loom and the outer diameter of the circular needle loom.

2. The needled preform manufacturing apparatus of claim 1, wherein the fiber strip comprises a substantially continuous narrow strip of at least one of unidirectional, bidirectional or multi-axial carbon fiber or Polyacrylonitrile (PAN) fiber textile.

3. The needled preform manufacturing apparatus of claim 1, wherein the fiber strip is a three dimensional assembly of multiple layers of pre-needled multi-axial continuous oxidized polyacrylonitrile (PAN) fibers.

4. The needled preform manufacturing apparatus of claim 1, wherein the fiber strip is created through at least one of weaving, needling, stitch bonding, adhesive bonding, or hot-melt bonding techniques.

5. The needled preform manufacturing apparatus of claim 1, wherein the fiber strip comprises stretch-broken fibers introduced within the fiber strip.

6. The needled preform manufacturing apparatus of claim 1, further comprising an electronic unwinder coupled to the supply of fiber strip, wherein the electronic unwinder is configured to interact with the moveable positive fiber strip delivery mechanism.

7. The needled preform manufacturing apparatus of claim 1, wherein the fiber strip is about 0.4 inches to about 1.8 inches wide.

8. The needled preform manufacturing apparatus of claim 1, wherein the fiber strip is laid down in such a way that a consecutive layer of fiber strip presents a staggered pattern across a radial direction of a preform.

9. The needled preform manufacturing apparatus of claim 1, wherein positive delivery via the moveable positive fiber strip delivery mechanism comprises pushing the fiber strip to a desired location while imparting at least one of little or no tension on the fiber strip.

10. The needled preform manufacturing apparatus of claim 1, further comprising a sensor coupled to at least one of the moveable positive fiber strip delivery mechanism and the circular needle loom, wherein the sensor is configured to control operation of an electronic unwinder.

11. The needled preform manufacturing apparatus of claim 1, wherein the supply of fiber strip comprises a spool.

* * * * *